United States Patent
Baldwin et al.

(10) Patent No.: US 8,269,102 B1
(45) Date of Patent: Sep. 18, 2012

(54) RETROFIT OUTLET ELECTRICAL BOX

(75) Inventors: Jeffrey P. Baldwin, Phoenix, AZ (US); Lincoln Jolley, Stansbury Park, UT (US); Richard L. Cleghorn, Tempe, AZ (US); Iven Dieterle, Tempe, AZ (US)

(73) Assignee: Hubbell Incorporated, Shelton, CT (US)

(*) Notice: Subject to any disclaimer, the term of this patent is extended or adjusted under 35 U.S.C. 154(b) by 294 days.

(21) Appl. No.: 12/553,016

(22) Filed: Sep. 2, 2009

Related U.S. Application Data

(60) Provisional application No. 61/093,500, filed on Sep. 2, 2008.

(51) Int. Cl.
*H02G 3/08* (2006.01)

(52) U.S. Cl. .............. 174/50; 174/481; 174/53; 174/58; 220/3.2; 220/3.3; 220/4.02; 248/906

(58) Field of Classification Search ............ 220/3.2–3.9, 220/4.02; 248/906, 27.1, 343, 74.3; 174/480, 174/481, 50, 53, 57, 58, 54, 61, 63
See application file for complete search history.

(56) References Cited

U.S. PATENT DOCUMENTS

| | | | |
|---|---|---|---|
| 2,581,755 A * | 1/1952 | Dieffenderfer | 220/3.6 |
| 2,658,704 A * | 11/1953 | Smith | 220/3.6 |
| 2,757,817 A * | 8/1956 | Egan | 220/3.5 |
| 3,963,204 A * | 6/1976 | Liss | 174/58 |
| 4,408,696 A * | 10/1983 | Crosson | 174/58 |
| 4,805,856 A * | 2/1989 | Nicoli et al. | 248/74.3 |
| 5,434,359 A * | 7/1995 | Schnell | 174/58 |
| 6,557,305 B1 * | 5/2003 | Hayes | 174/58 |
| 7,105,742 B1 * | 9/2006 | Jolly | 174/50 |
| 7,129,411 B2 * | 10/2006 | Bump et al. | 174/58 |
| 7,307,212 B1 * | 12/2007 | Gretz | 174/53 |
| 7,423,215 B2 * | 9/2008 | Cardenas et al. | 174/50 |
| 7,855,338 B2 * | 12/2010 | Troder | 174/50 |

\* cited by examiner

*Primary Examiner* — Angel R Estrada
(74) *Attorney, Agent, or Firm* — Booth Udall, PLC

(57) ABSTRACT

A retrofit electrical outlet comprises an electrical box comprising one or more moveable braces coupled to linear brace actuators, whereby pulling on the linear brace actuator causes the brace to move toward the front end of the box to impinge a wall surface material between the brace and a front flange of the box. Releases may be included to allow for adjustment of the braces. The braces may move linearly or pivotally toward the wall surface material. The linear brace actuator may be stored within the wall for future use.

20 Claims, 6 Drawing Sheets

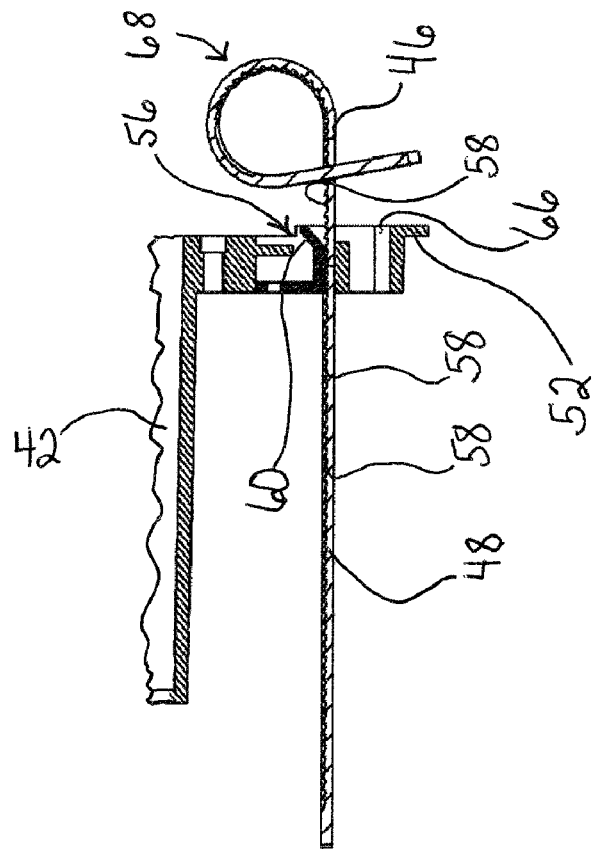
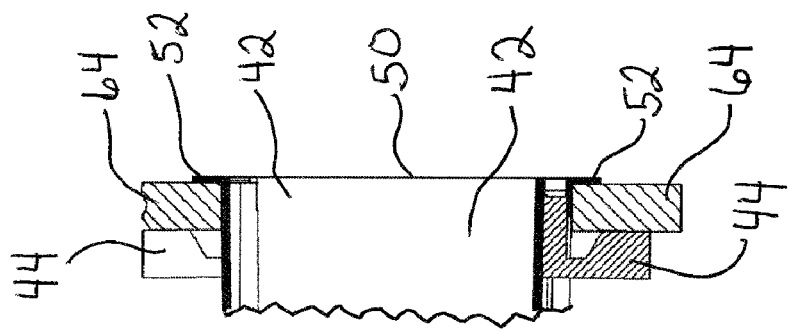
FIG. 8
FIG. 7

RETROFIT OUTLET ELECTRICAL BOX

CROSS REFERENCE TO RELATED APPLICATIONS

This document claims the benefit of the filing date of U.S. Provisional Patent Application 61/093,500 to Baldwin, et al. entitled "Retrofit Outlet Electrical Box", which was filed on Sep. 2, 2008, the disclosure of which is hereby incorporated herein by reference.

BACKGROUND

1. Technical Field

Aspects of the present documents relate generally to electrical boxes for outlets, connectors, wires and switches, and more specifically to electrical boxes designed for coupling after a wall has been built directly to a planar wall covering material such as drywall or paneling rather than to a wall internal structure like a stud.

2. Background Art

Electrical boxes, also called box or boxes herein, are known in the art. Such conventional electrical boxes typically consist of a generally box-shaped structure that is mounted to a wall stud or other interior wall structure via one or more nails, screws, or other fastening devices. The box contains an opening for an electrical device or connector which is typically installed within the box after the box is mounted within a wall. Fastener holes are typically provided as openings in the box to allow the box to be fastened to a wall stud.

An electrical box typically includes an opening adjacent to the planar wall surface. If an electrical box needs to be installed after the wall covering has been added, a nonconventional electrical box must be used to avoid damaging the wall covering. Challenges associated with typical installation of an electrical box in an existing wall may include: locating an interior wall stud, placing the electrical box in a specific and convenient location, and then anchoring the electrical box securely in the wall without causing undesirable damage to the wall surface.

One particular prior art solution involves a rotating "flipper" that rotates from a first position flush with an outside surface of the box approximately 90 degrees to a second position in which the flipper extends perpendicularly from the outside surface of the box. By the installer turning a metal screw on the front of the box, typically with a power tool else the process is very long, the flipper moves along the outside surface of the box toward its front until the flipper contacts a back surface of the wall covering and clamps the wall covering between a front rim of the box and the flipper.

SUMMARY

Aspects of this document relate generally to safety outlets.

In one aspect, a retrofit electrical box assembly may comprise: an electrical box having at least one side wall and a back wall and an open front end defining a space within the electrical box and a front perimeter edge having at least one front flange with a rear surface and at least one moveable brace responsive to a brace actuator, the brace actuator comprising a surface engaged with a restraint on the at least one side wall of the electrical box. Linear movement of the brace actuator away from the open front end of the electrical box moves the at least one moveable brace toward the at least one front flange and moves the brace actuator through the restraint. The restraint may be configured to engage the surface of the brace actuator at any of a plurality of locations along a length of the brace actuator. The at least one movable brace may be configured to impinge a wall surface material between the at least one movable brace and the rear surface of the front flange when the electrical box is installed on the wall surface material and the linear brace actuator is pulled away from the open front end of the electrical box.

Particular implementations may include one or more of the following: The surface of the brace actuator may comprise a serrated surface. A surface of the restraint may comprise a corresponding surface textured to engage the serrated surface of the brace actuator. The restraint may comprise a flexible release coupled thereto, the flexible release configured such that actuation of the flexible release causes the restraint to disengage the surface of the brace actuator. The brace may be positioned adjacent an end of the brace actuator. The brace may be fixedly coupled to the brace actuator. The brace may move substantially linearly toward the at least one flange. The brace may move pivotally toward the at least one flange.

Particular implementations may further comprise a brace actuator return channel adjacent a first flange of the at least one flange, the brace actuator return channel sized to receive a pull end of the brace actuator.

According to another aspect, a method of installing a retrofit electrical box assembly may comprise: inserting an electrical box having a front flange in a hole in a wall such that a rear surface of the front flange is in contact with a front surface of the wall; pulling a brace actuator extending adjacent a front side of the front flange away from the front flange to responsively pull a brace extending behind a rear surface of the front flange toward the rear surface of the front flange, the brace actuator securable with the electrical box against movement of the brace away from the front flange at a plurality of different points along the brace actuator; engaging an inside surface of the wall with the moveable brace; impinging the wall between the brace and the rear surface of the front flange; and restraining the brace in its engaged position to maintain the electrical box in its positional relationship with the wall.

Particular implementations may comprise one or more of the following: Engaging may further comprise releasing the brace from its engaged position against the wall by moving a restraint engaged with the brace actuator. Restraining may further comprise restraining the brace actuator with a restraint on the electrical box configured to engage the brace actuator to allow movement of the brace toward the front flange and restrict movement of the brace away from the front flange. Engaging the inside surface of the wall may comprise pivoting the moveable brace toward the front flange.

According to another aspect, a retrofit electrical box assembly may comprise an electrical box having at least two opposing side walls each comprising an inner surface and a front perimeter edge having a front flange having a rear surface, at least one brace comprising an engagement surface, the at least one brace moveably coupled to the inner surface of at least one of the at least two opposing side walls and positionable between a disengaged position and an engaged position such that at least a portion of at least one brace passes through at least one of the at least two opposing side walls when in the engaged position. The at least one brace may be configured to impinge a wall between the engagement surface of the at least one brace and the rear surface of the front flange when the one or more engagement wedges are in the engaged position.

Particular implementations may comprise one or more of the following: At least one of the engagement surface and a surface opposing the engagement surface of the brace may include an angled surface. The engagement surface may be configured to resist movement of the brace against a surface it comes in contact with.

According to another aspect, a method of installing a retrofit electrical box assembly may comprise: inserting an electrical box having a front flange in a hole in a wall such that a rear surface of the front flange is in contact with a front surface of the wall; sliding at least one brace along an inside surface of at least one of at least two opposing side walls such that at least a portion of the at least one brace passes through at least one of the at least two opposing side walls; engaging an inside surface of the wall with an engagement surface of the at least one brace; and impinging a wall between the engagement surface of at least one of the one or more engagement wedges and the rear surface of the front flange.

Particular implementations may include one or more of the following: Engaging the inside surface of the wall may comprise engaging the inside surface of the wall with one or more locking teeth of one or more engagement surfaces. Impinging a wall between the engagement surface may comprise releasably impinging the inside surface of the wall.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

A safety outlet will hereinafter be described in conjunction with the appended drawings, where like designations denote like elements, and:

FIG. 7 is a cross-sectional view of the electrical box assembly of FIG. 6 installed in the wall, the cross-section taken along section line 7-7 of FIG. 6;

FIG. 8 is a cross-sectional view of the electrical box assembly of FIG. 6 installed in the wall, the cross-section taken along section line 8-8 of FIG. 6;

DESCRIPTION

This disclosure, its aspects and implementations, are not limited to the specific components or assembly procedures disclosed herein. Many additional components and assembly procedures known in the art consistent with the intended operation of a retrofit electrical box and/or assembly procedures for an electrical box will become apparent from this disclosure. Accordingly, for example, although particular implementing components are described, such components may comprise any shape, size, style, type, model, version, measurement, concentration, material, quantity, and/or the like as is known in the art for such safety outlets, consistent with the intended operation of a safety outlet.

There are a variety of retrofit electrical box implementations contemplated, disclosed herein and made clear from the present disclosure. Particular implementations include electrical boxes designed for use with various types of electrical devices. Particular implementations also include boxes which may be mounted within a hole in a wall. Particular implementations also include boxes that may allow a user to mount a box in a wall without attaching the box to a wall stud or other interior structural element. Particular implementations also include boxes that may be maintained in a substantially flush position relative to a wall. The various implementations may be manufactured using conventional procedures known to those of ordinary skill in the art as added to and improved upon through the procedures described herein.

It is desirable to improve the ease, convenience, and flexibility with which an electrical box may be mounted within a wall as compared to conventional methods, by providing moveable clamping members which permit an electrical box to be placed within a pre-formed hole in an existing wall and then easily secured without the requirement of power tools. In cases where a building has long since been built, the disclosed device may be particularly convenient.

There are many aspects of an electrical box disclosed herein, of which one, a plurality, or all aspects may be used in any particular implementation.

Figure 2:
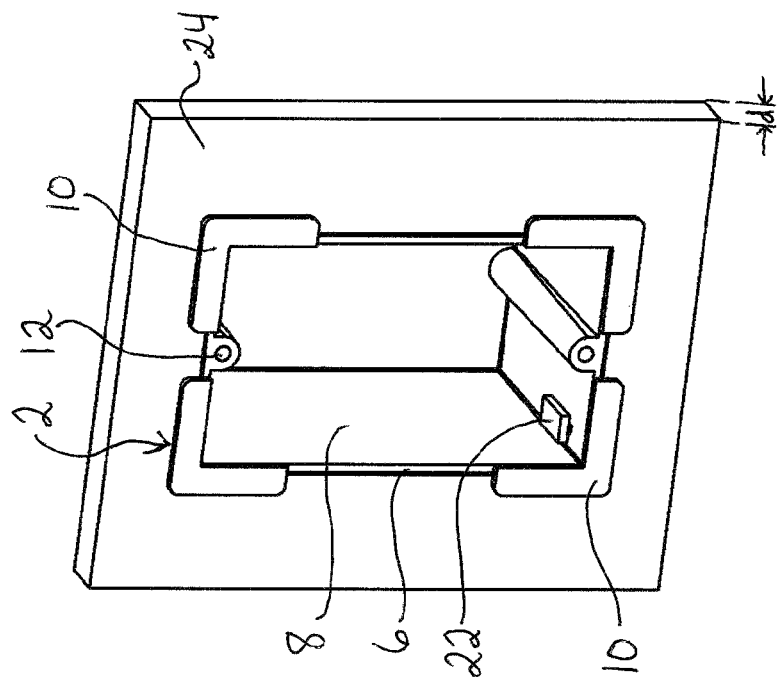
FIG. 2 is a perspective view of the electrical box assembly of FIG. 1 after installation in the wall.
Figure 1:
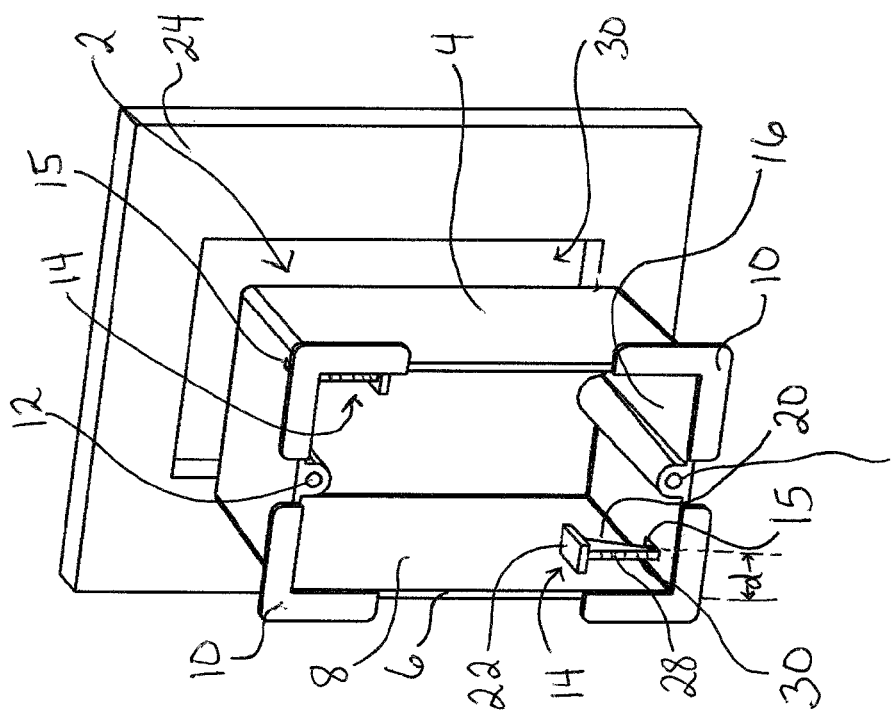
FIG. 1 is perspective view of an electrical box assembly of a first implementation prior to installation in a wall.

FIGS. 1 and 2 illustrate perspective views of a non-limiting example of a first implementation of a quick-installation retrofit electrical box assembly 2 comprising an electrical box 4 comprising a front opening 6 having a peripheral wall 8 and at least one front flange 10 extending from the peripheral wall 8. Two box mounting screw bosses 12, known in the art, are included in the electrical box 4. One or more brace 14 extends through at least one opening 15 in a side 16, 18 of the peripheral wall 8 of the electrical box 4. In particular implementations, two or more braces 14 extend through at least opposing sides 16, 18 of the peripheral wall 8 of the electrical box 4. The braces 14 may comprise at least one angled edge 20 at an angle other than 90 degrees with respect to the substantially planar cap 22 of the braces 14. The angled edge 20 causes the brace 14 to become closer to the wall surface material 24 the farther the brace 14 is pushed through the opening 15 in the side 16, 18 of the peripheral wall 8. So long as the distance "d" between the front flange 10 and the brace 14 is less than the thickness of the wall surface material 24, pressing the brace 14 through the opening will cause the wall surface material 24 to be impinged between the brace 14 and the front flange 10, thereby securing the box in place on the wall surface material.

In particular implementations, the distance "d" is substantially equal to the wall surface material 24 thickness so that the brace 14 is pressed almost flat with the side 16, 18 of the peripheral wall 8. Alternatively, the brace 14 would only be pushed partially through the peripheral wall 8 until the box was securely attached to the wall surface material 24. The cap 22 of the brace 14 may be textured in some implementations. The angled edge 20 or opposing edge 28 may be oriented toward the wall surface material 24. The edge 20 or 28 oriented toward the wall surface material 24 may comprise a textured, serrated or otherwise gripping surface 30 configured to grip the interior surface of the wall surface material 24. Additionally, the other edge 20 or 28 oriented away from the wall surface material 24 may also comprise a textured or otherwise gripping, such as with periodic grooves, surface to help to maintain the brace 14 in its position when pushed through the opening 15. By providing gripping surfaces on the brace 14, the sliding brace 14 may be moved into an engaged position (FIG. 2) with respect to the wall surface material 24, but resists the disengagement of the sliding brace 14 from the interior surface of the wall surface material, once engaged.

A user desiring to mount a retrofit electrical box assembly 2 within a wall may first cut a hole 30 in a wall surface material 24 slightly larger than the outer surface of the perimeter wall 8. A user may next pull any necessary wires from within the wall into the electrical box 4 as is conventionally done. Next, a user may place the electrical box 4 within the hole, rear end first. With the electrical box 4 placed within the hole 30 in the wall surface material 24, a user may align the box 4 so that the front flange 10 is located along a front surface of the wall, just outside of the hole 30 in the wall. With the electrical box 4 so positioned, a user may thereafter depress the cap 22 of the one or more braces 14 so that an engagement surface of the brace 14 engages the wall, thereby impinging the wall surface material 24 between the engagement surface of the brace 14 and the rear surface of the front flange 10. With the wall surface material 24 impinged between the engagement surface of the brace 14 and the rear surface of the front flange 10, the electrical box 4 is fixed in position with respect to the wall, and ready for mounting therein one or more electrical devices. A user may wish to complete the installation by finishing the front surface of the wall so that the space between the edge of the hole 30 and the outer surface of the electrical box is not visible.

Figure 3:
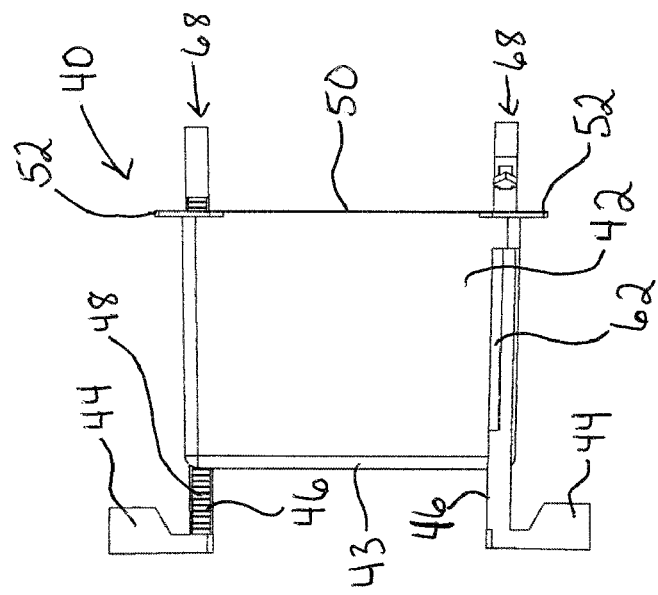
FIG. 3 is a side view of an electrical box assembly of a second implementation with sliding braces.

FIGS. 3-10 illustrate other non-limiting examples of implementations of a retrofit electrical box assembly 40. Like the previous implementation of FIGS. 1 and 2, the electrical box assembly 40, as illustrated in FIG. 3, comprises an electrical box 42, an open front end 50, one or more flanges 52 extending from the front edge of the front end 50, box mounting screw bosses 54 and other structures typical to conventional electrical boxes. Like the previous implementation, the electrical box 42 mounts to a wall surface material 64 (FIG. 4) by impinging the wall surface material 64 between the front flange 52 of the electrical box 42 and the one or more braces 44. Different from the implementation illustrated in FIGS. 1 and 2, however, the implementations illustrated in FIGS. 3-10 comprise a different brace structure and impingement movement.

FIG. 3 is a side view of the electrical box assembly 40 showing at least one brace 44 coupled to the electrical box 42, and in this particular implementation each integrally formed with, a corresponding linear brace actuator 46. The linear brace actuator 46 comprises an engagement surface 48 configured to resist movement of the brace 44 away from the front end 50 of the electrical box 42. In the particular implementations illustrated in FIGS. 3-10, the linear brace actuator 46 comprises a serrated engagement surface 48 similar to that found on what is commonly known as a "zip tie" in the electrical contracting industry. As illustrated in the cross-sectional view of FIG. 8, the serrated engagement surface 48 of the linear brace actuator 46 is engaged by corresponding structures on restraint 56 so that the angled serrations 58 of the engagement surface 48 can easily be drawn through the restraint 56 in a direction toward the front 50 of the box 42, but strongly resist movement toward the rear of the box 42. For the particular implementation illustrated in FIG. 8, the restraint 56 comprises a release tab 60 which when pushed away from the linear brace actuator 46 causes the restraint 56 to disengage from the engagement surface 48 of the linear brace actuator 46 so that the box 42 can be released from engagement with the wall.

The brace 44, through manipulation of the brace actuator 46, slidably couples with the electrical box 42 such that the brace 44 can move toward the front 50 of the box 42. Although the particular implementations illustrated in FIGS. 3-10 include tracks 62, it should be noted that those tracks 62 are optional and may be excluded in many particular implementations. Provided the brace actuator 46 as some degree of rigidity and includes a guide, such as the restraint 56, to maintain the relative orientation of the brace 44 as the linear brace actuator 46 is pulled toward the front 50 of the box 42. Additionally, although the braces 44 used in any of the particular implementations are shown to have a particular shape or structure, it should be noted that no particular shape or structure is required or intended to be implied by the use of these non-limiting examples. For example, it is specifically contemplated that although the particular braces shown in FIGS. 3-10 have only a narrow edge resting against the back surface of the wall surface material 64, a much wider foot may be included on the brace 44 so that the brace 44 finds more stable engagement with the wall surface material 64.

Figure 10:
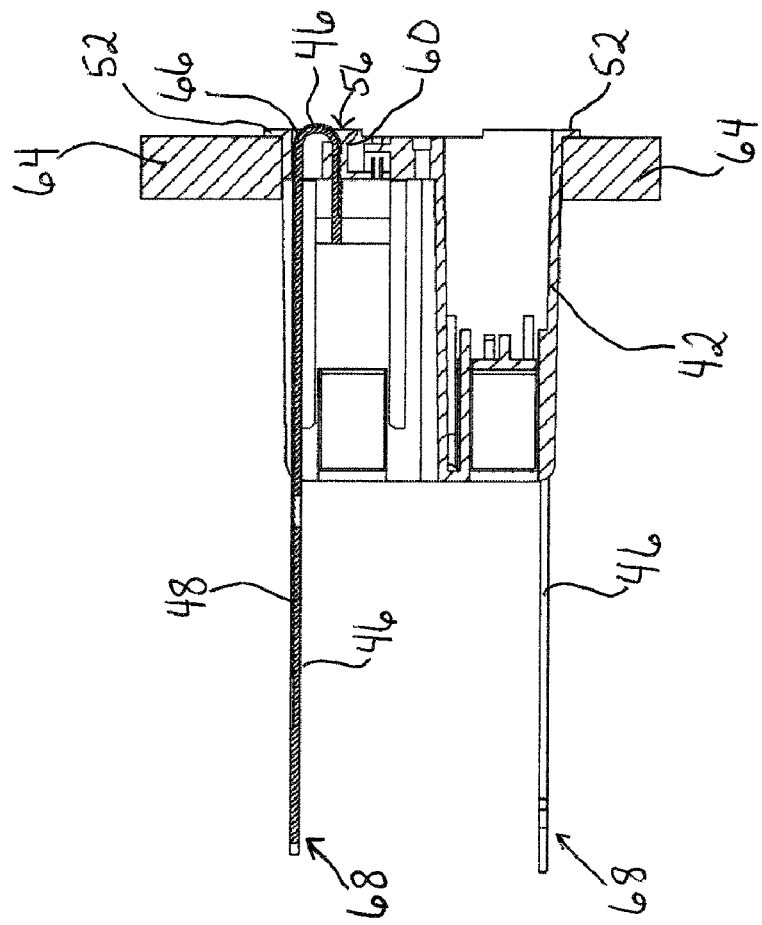
FIG. 10 is a cross-sectional view of the electrical box assembly of FIG. 9, the cross-section taken along section line 10-10 of FIG. 9.
Figure 9:
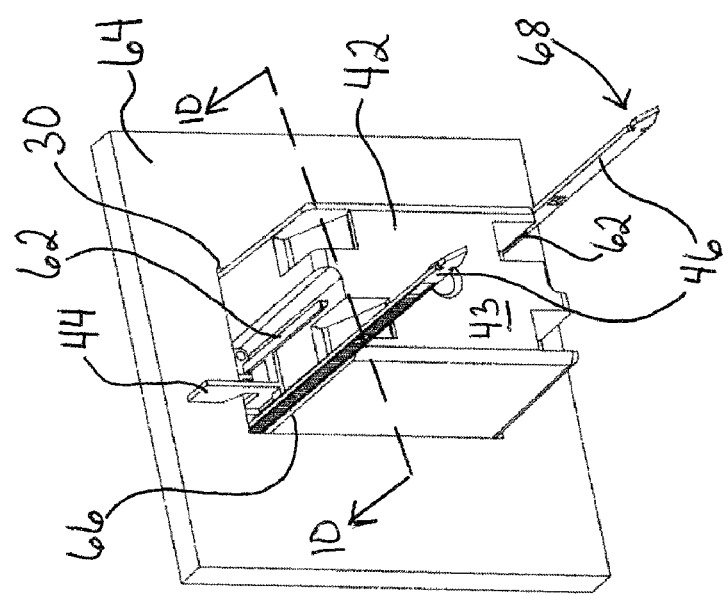
FIG. 9 is a rear perspective view of the electrical box assembly of FIG. 3 with the linear brace actuators stored.

FIGS. 9 and 10 illustrate that after the brace 44 is pulled all the way to the inner surface of the wall surface material 64 and the electrical box 42 is securely coupled to the wall, the linear brace actuators 46 may be fed back through channels 66 (see also FIGS. 4 and 8) so that the ends of the brace actuators 46 are stored within the wall. If the electrical box 42 ever needs to be released from the wall or tightened on the wall, the restraint 56 may be pressed to release the brace 44 and the linear brace actuator 46 can be pulled out from storage within the wall and again used to manipulate the brace 44 behind the wall with respect to the electrical box 42 and wall surface material 64. In the particular implementation illustrated in FIGS. 3-10, the linear brace actuators 46 include a pull end 68 formed by looping the linear brace actuator 46 and threading it through itself to form a pull loop. Alternate implementations may comprise a fixed pull loop or may include no loop at all. Although the particular implementation illustrated in FIGS. 9 and 10 demonstrates that the linear brace actuator 46 may be stored within the wall, in other particular implementations the linear brace actuator 46 may be optionally cut or broken off and not stored for future use. In a particular implementation, the linear brace actuator 46 is an integral molded plastic component formed of polyvinylchloride (PVC) or other strong but flexible material which is readily cut by a razor blade or utility knife.

Figure 4:
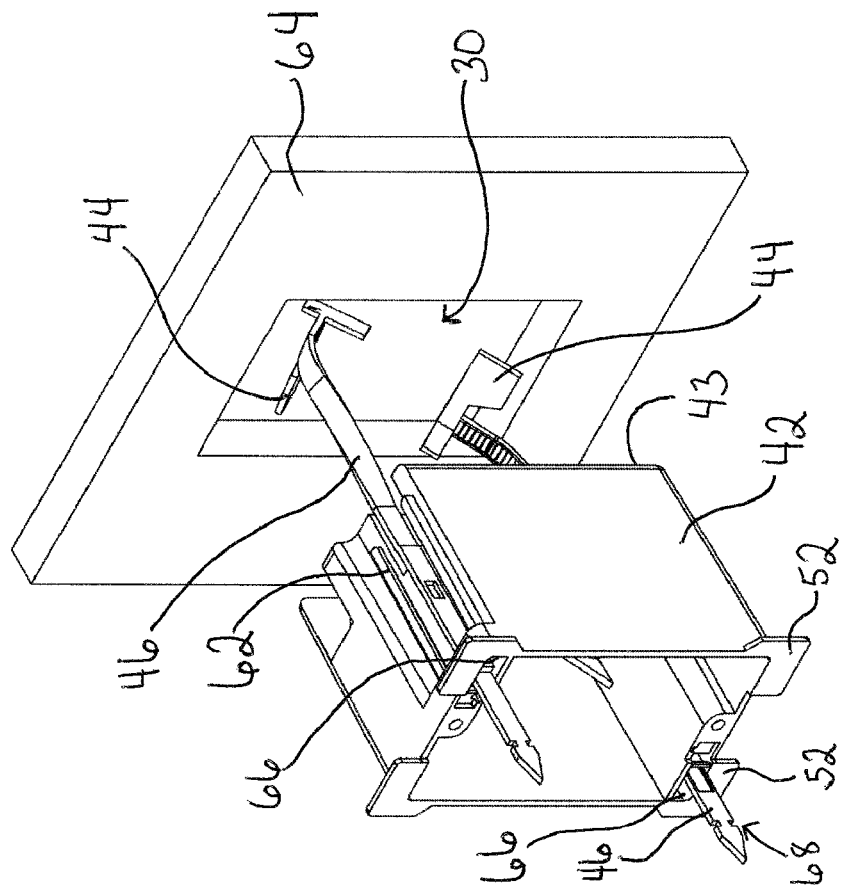
FIG. 4 is a front perspective view of the electrical box assembly of FIG. 3 being installed into a wall.
Figure 6:
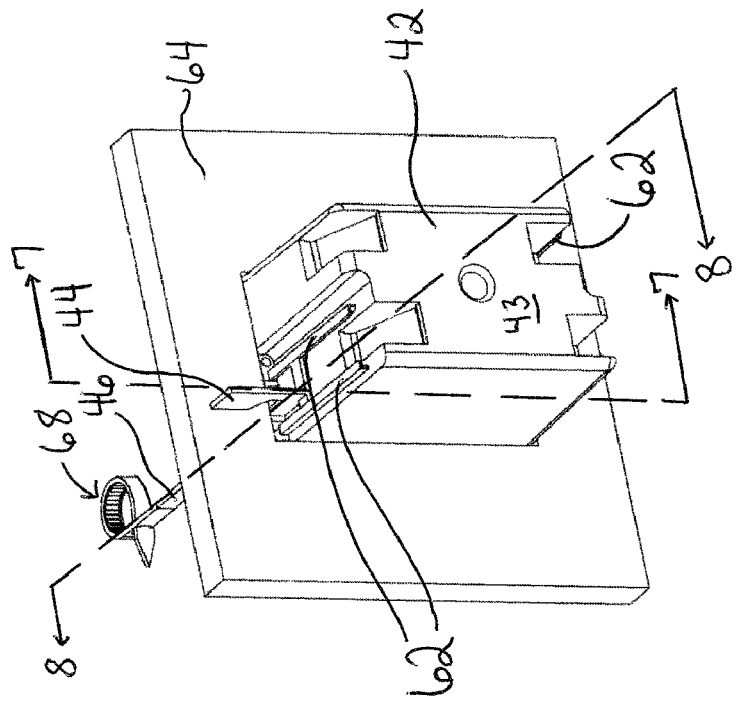
FIG. 6 is rear perspective view of the electrical box assembly of FIG. 3 after the braces are pulled toward the wall.
Figure 5:
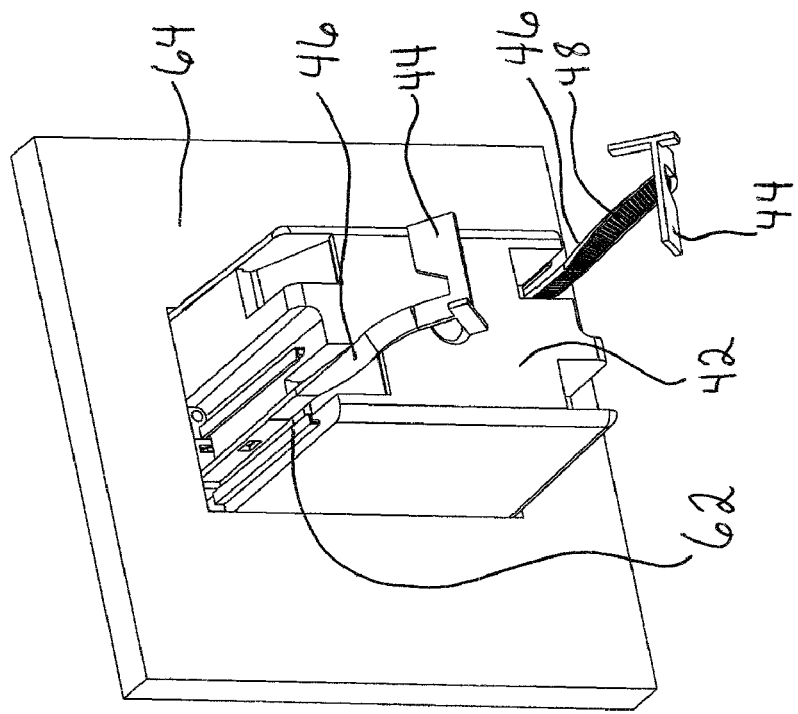
FIG. 5 is a rear perspective view of the electrical box assembly of FIG. 3 being installed into the wall.

A user desiring to mount a retrofit electrical box assembly 40 within a wall may first cut a hole 30 in a wall surface material 64 slightly larger than the outer surface of the perimeter wall of the electrical box 42. A user may next pull any necessary wires from within the wall into the electrical box 42 as is conventionally done through openings in the electrical box 42. Next, a user may place the electrical box 42 within the hole 30, rear end first (FIGS. 4 and 5). For this particular implementation, the braces 44 will need, to be extended beyond the rear end 43 of the electrical box 42 so that the one or more braces 44 can be bent down so they will fit into the hole 30. Because the brace actuators 46 are formed of strong but flexible material with a degree of rigidity, like PVC or other suitable plastic, the general orientation of the braces 44 will be corrected to an upright position against the wall surface material 64 (FIG. 6) as they are pulled toward the wall. If they are pulled adjacent to the side wall of the electrical box 42, they will interfere with insertion of the electrical box 42 into the hole. With the electrical box 42 placed within the hole 30 in the wall surface material 64, a user may align the box 42 so that the front flange 52 is located along a front surface of the wall surface material 64, just outside of the hole 30 in the wall (FIGS. 5 and 8). With the electrical box 42 so positioned, a user may thereafter pull on the linear brace actuator 46 associated with each brace 44 so that each brace 44 engages the wall, thereby impinging the wall surface material 64 between the brace 44 and the rear surface of the front flange 52 (FIGS. 6 and 7). With the wall surface material 64 impinged between the brace 14 and the rear surface of the front flange 52, the electrical box 42 is fixed in position with respect to the wall, and ready for mounting therein one or more electrical devices. The pull ends 68 of the linear brace actuators 46 may be tucked back into the wall along channels 66 adjacent the front flanges 52 (FIGS. 9 and 10).

Figure 11:
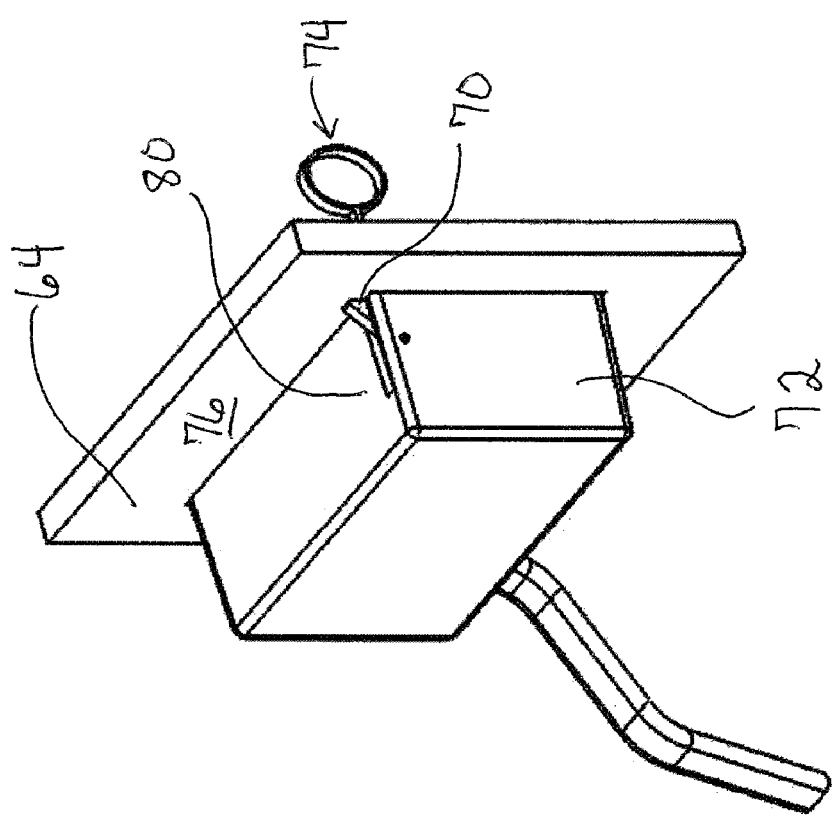
FIG. 11 is a third particular implementation.

FIG. 11 illustrates a perspective rear view of an electrical box of a third implementation. In contrast to the previous implementations, this particular implementation comprises a pivoting brace 70 configuration to impinge a wall surface material 64 between a rear surface of a front flange (not shown) of the electrical box 72 and the pivoting brace 70. Although the front flange is obscured in FIG. 11, the front flange of the second implementation is structurally identical to that disclosed with respect to the first implementation.

Accordingly, installation of the electrical box according to the third implementation may, in many respects, be similar to the installation of the electrical box of the first or second implementation. A user desiring to mount the electrical box 72 within a wall may first cut a hole in a wall slightly larger than the outer surface of the perimeter wall. A user may next pull into the electrical box opening any necessary wires from within the wall. Next, a user my place the electrical box 72 within the hole, rear edge first. With the electrical box placed within the hole in the wall surface material 64, a user may align the box so that the front flange (not shown, but substantially the same as the front flange in the first and second implementations) is located along a front surface of the wall, just outside of the hole in the wall. With the electrical box 72 so positioned, a user may thereafter pull towards the user the one or more brace actuators 74, which are in mechanical cooperation with one or more moveable braces 70. Different from the moveable braces of the implementation shown in FIGS. 3-10, the braces 70 of the implementation shown in FIG. 11 pivots toward the rear surface 76 of the wall surface material 64 to engage the wall on a pivot point. The previous two implementations each moved linearly to engage the wall. The first moving linearly almost parallel to the wall, the second moving linearly perpendicularly to the wall. By pulling on the brace actuator 74, the moveable brace 70 moves from a disengaged position to an engaged position against the interior surface 76 of the wall surface material 64. In particular, when the moveable brace 70 is in a disengaged position, the moveable brace 70 does not contact an interior surface of the wall and retracts to near an external surface 80 of the box 72 to allow for placement of the box 72 into the hole in the wall surface material 64. In particular implementations, the brace actuator 74 of this design as well may be removable such that when once the movable brace 70 is moved to its engaged position, the brace actuator 74 may be cut off, snapped off or otherwise removed. In particular implementations, the moveable brace may comprise one or more incremental positioning points and the electrical box 72 may comprise a restraint similar to that of the implementation of FIGS. 3-10. Those structures will not be discussed again here as the same operation and structure may be used interchangeably for this implementation. As with the previous implementation, use of a serrated or similar structure enables a plurality of engaged positions along which the moveable brace can lock into position.

Therefore, with the electrical box 72 positioned within the hole in the wall, a user may engage one or more moveable braces 70 (via one or more brace actuators 74) so that the engagement surface of the one or more moveable braces 70 engages the interior surface 76 of the wall, thereby impinging the wall between the brace 70 and the rear surface of the front flange. With the wall impinged between the moveable brace (s) 70 and the rear surface of the front flange, the electrical box 72 is fixed in position with respect to the wall, and ready for mounting therein one or more electrical devices The implementations listed here, and many others, will become readily apparent to those of ordinary skill in the art from this disclosure. Those of ordinary skill in the art will readily understand the versatility with which this disclosure may be applied.

Implementations of electrical box, and implementing components, may be constructed of a wide variety of materials known in the art for constructing electrical box. For example, the components may be formed of: metals; polymers such as thermoplastics (such as ABS, Fluoropolymers, Polyacetal, Polyamide; Polycarbonate, Polyethylene, Polysulfone, and/or the like); thermosets (such as Epoxy, Phenolic Resin, Polyimide, Polyurethane, Silicone, and/or the like), any combination thereof, and/or other like materials. Those of ordinary skill in the art will readily be able to select appropriate materials and manufacture these products from the disclosures provided herein.

Some components defining electrical boxes may be manufactured simultaneously and integrally joined with one another, while other components may be pre-manufactured or manufactured separately and then assembled with the integral components. Various implementations may be manufactured using conventional procedures as added to and improved upon through the principles described here. Components manufactured separately may then be coupled or removably coupled with the other integral components in any manner.

It will be understood that implementations are not limited to the specific components disclosed herein, as virtually any components consistent with the intended operation of a method and/or system implementation for electrical box may be utilized. Accordingly, for example, although particular component examples may be disclosed, such components may comprise any shape, size, style, type, model, version, class, grade, measurement, concentration, material, weight, quantity, and/or the like consistent with the intended operation of a method and/or system implementation for an electrical box may be used.

In places where the description above refers to particular implementations of an electrical box, it should be readily apparent that a number of modifications may be made without departing from the spirit thereof and that these implementations may be applied to other retrofit boxes. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A retrofit electrical box assembly comprising:
    an electrical box having at least one side wall, a back wall, and an open front end defining a space within the electrical box, and a front perimeter edge having at least one front flange with a rear surface;

at least one moveable brace responsive to a brace actuator, the brace actuator comprising a surface engaged with a selectively releasable restraint tab on the at least one side wall of the electrical box, wherein linear movement of the brace actuator away from the open front end of the electrical box moves the at least one moveable brace toward the at least one front flange and moves the brace actuator through the restraint, wherein the selectively releasable restraint tab is configured to engage the surface of the brace actuator at any of a plurality of locations along a length of the brace actuator and disengage the surface of the brace actuator upon actuation of the releasable restraint tab;

wherein the at least one movable brace is configured to impinge a wall surface material between the at least one movable brace and the rear surface of the front flange when the electrical box is installed on the wall surface material and the linear brace actuator is pulled away from the open front end of the electrical box.

2. The assembly of claim 1, wherein the surface of the brace actuator comprises a serrated surface.

3. The assembly of claim 2, wherein a surface of the releasable restraint tab comprises a corresponding surface textured to engage the serrated surface of the brace actuator.

4. The assembly of claim 3, wherein the brace actuator further comprises a pull end formed by looping the brace actuator and threading the brace actuator through itself to for a pull loop.

5. The assembly of claim 1, wherein the brace is positioned adjacent an end of the brace actuator.

6. The assembly of claim 1, wherein the brace is fixedly coupled to the brace actuator.

7. The assembly of claim 1, further comprising a brace actuator return channel adjacent a first flange of the at least one flange, the brace actuator return channel sized to receive a pull end of the brace actuator.

8. The assembly of claim 1, wherein the brace moves substantially linearly toward the at least one flange.

9. The assembly of claim 1, wherein the brace moves pivotally toward the at least one flange.

10. A method of installing a retrofit electrical box assembly comprising:
inserting an electrical box having a front flange in a hole in a wall such that a rear surface of the front flange is in contact with a front surface of the wall;
pulling a brace actuator extending adjacent a front side of the front flange away from the front flange to responsively pull a brace extending behind a rear surface of the front flange toward the rear surface of the front flange, the brace actuator securable with the electrical box against movement of the brace away from the front flange at a plurality of different points along the brace actuator;
engaging an inside surface of the wall with the moveable brace;
impinging the wall between the brace and the rear surface of the front flange; and
restraining the brace in its engaged position to maintain the electrical box in its positional relationship with the wall;
inserting a pull end of the brace actuator into a brace actuator return channel adjacent to the front flange after impinging the wall between the brace and the rear surface of the front flange.

11. The method of claim 10, wherein engaging further comprising selectively releasing the brace from its engaged position against the wall by moving a restraint engaged with the brace actuator.

12. The method of claim 10, wherein restraining the brace comprises restraining the brace actuator with a restraint on the electrical box configured to engage the brace actuator to allow movement of the brace toward the front flange and restrict movement of the brace away from the front flange.

13. The method of claim 10, wherein engaging the inside surface of the wall comprises pivoting the moveable brace toward the front flange.

14. A retrofit electrical box assembly comprising:
an electrical box having at least two opposing side walls each comprising an inner surface and a front perimeter edge having a front flange having a rear surface;
at least one brace comprising an engagement surface, the at least one brace moveably coupled to the inner surface of at least one of the at least two opposing side walls and positionable between a disengaged position and an engaged position such that at least a portion of at least one brace passes through at least one of the at least two opposing side walls when in the engaged position; and
wherein the at least one brace is configured to impinge a wall between the engagement surface of the at least one brace and the rear surface of the front flange when the at least one brace is in the engaged position and wherein the at least one brace is in direct contact with a rear wall surface of the wall parallel to a front wall surface of the wall and the rear surface of the front flange is in direct contact with the front wall surface of the wall.

15. The assembly of claim 14, wherein at least one of the engagement surface and a surface opposing the engagement surface of the brace is an angled surface.

16. The assembly of claim 14, wherein the engagement surface is configured to resist movement of the brace against a surface it comes in contact with.

17. The method of claim 14, wherein the at least one brace is at least two braces extending through the opposing sides of the electrical box, each of the at least two braces comprising its engagement surface in direct contact with the rear wall surface of the wall.

18. A method of installing a retrofit electrical box assembly comprising:
inserting an electrical box having a front flange in a hole in a wall such that a rear surface of the front flange is in contact with a front surface of the wall;
sliding at least one brace along an inside surface of at least one of at least two opposing side walls such that at least a portion of the at least one brace passes through at least one of the at least two opposing side walls;
engaging an inside surface of the wall with an engagement surface of the at least one brace; and
impinging a wall between the engagement surface of at least one brace and the rear surface of the front flange through direct contact of the engagement surface with a rear surface of the wall, parallel to the front surface of the wall, and direct contact of the rear surface of the front flange with the front surface of the wall.

19. The method of claim 18, wherein engaging the inside surface of the wall comprises engaging the inside surface of the wall with one or more locking teeth of one or more engagement surfaces.

20. The method of claim 18, wherein impinging a wall between the engagement surface comprises releasably impinging the inside surface of the wall.

* * * * *